US012722666B2

(12) United States Patent
Seki et al.

(10) Patent No.: US 12,722,666 B2
(45) Date of Patent: Sep. 1, 2026

(54) VEHICLE ENTRY CONTROL DEVICE, VEHICLE ENTRY CONTROL METHOD, AND RECORDING MEDIUM

(71) Applicant: NEC Corporation, Tokyo (JP)

(72) Inventors: Sawaka Seki, Tokyo (JP); Takashi Nunomoto, Tokyo (JP); Takumi Shiba, Tokyo (JP); Seito Nagashima, Tokyo (JP); Hitomi Ito, Tokyo (JP); Masaru Yanai, Tokyo (JP); Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 18/834,654

(22) PCT Filed: Feb. 24, 2022

(86) PCT No.: PCT/JP2022/007487

§ 371 (c)(1),
(2) Date: Jul. 31, 2024

(87) PCT Pub. No.: WO2023/162063

PCT Pub. Date: Aug. 31, 2023

(65) Prior Publication Data

US 2025/0108841 A1 Apr. 3, 2025

(51) Int. Cl.
*B60W 60/00* (2020.01)

(52) U.S. Cl.
CPC ...... *B60W 60/0055* (2020.02); *B60W 60/001* (2020.02); *B60W 2540/221* (2020.02); *B60W 2540/30* (2013.01); *B60W 2552/53* (2020.02)

(58) Field of Classification Search
CPC ........... B60W 60/0055; B60W 60/001; B60W 2552/53; B60W 2540/30
See application file for complete search history.

(56) References Cited

U.S. PATENT DOCUMENTS 8,344,864 B1 * 1/2013 Al-Mutawa ........... B60W 50/14 340/435
2012/0083960 A1 * 4/2012 Zhu ......................... G06T 7/521 701/23

(Continued)

FOREIGN PATENT DOCUMENTS

JP 2002-127780 A 5/2002
JP 2005-164470 A 6/2005

(Continued)

OTHER PUBLICATIONS

Machine transaltion of JP2010210319A (Year: 2010).*

(Continued)

*Primary Examiner* — Kenneth M Dunne

(57) ABSTRACT

A vehicle entry control device according to an aspect of the present disclosure includes: at least one memory configured to store instructions; and at least one processor configured to execute the instructions to: acquire first driver information that is information indicating a driving tendency of a driver of a vehicle approaching a predetermined control target area; determine whether the vehicle is a target vehicle of entry restriction to a control target area based on the first driver information; and notify the vehicle determined as the target vehicle of entry restriction of information for preventing entry into the control target area.

13 Claims, 14 Drawing Sheets

(56) References Cited

U.S. PATENT DOCUMENTS

2017/0234689 A1* 8/2017 Gibson ................ G05D 1/0061
701/25
2018/0322783 A1* 11/2018 Toyoda ................. B60W 50/14
2022/0034678 A1* 2/2022 Chintakindi ....... G01C 21/3484

FOREIGN PATENT DOCUMENTS

| | | | |
|---|---|---|---|
| JP | 2007-051973 A | 3/2007 | |
| JP | 2010-008268 A | 1/2010 | |
| JP | 2010-152417 A | 7/2010 | |
| JP | 2010-210319 A | 9/2010 | |
| JP | 2015-108854 A | 6/2015 | |
| JP | 2016-181105 A | 10/2016 | |
| JP | 2018-136878 A | 8/2018 | |
| JP | 2021-128349 A | 9/2021 | |
| SE | 1651632 A1 * | 6/2018 | ........... B60K 28/066 |

OTHER PUBLICATIONS

Ullah et al , "Barrier Access Control Using Sensors Platform and Vehicle License Plate Characters Recognition", Jul. 2019, MDPI (Year: 2019).*

International Search Report for PCT Application No. PCT/JP2022/007487, mailed on Mar. 29, 2022.

English translation of Written opinion for PCT Application No. PCT/JP2022/007487, mailed on Mar. 29, 2022.

JP Office Action for JP Application No. 2024-502312, mailed on Aug. 12, 2025 with English Translation.

* cited by examiner

100
VEHICLE ENTRY CONTROL DEVICE
106
CONTROL TARGET AREA STORAGE MEANS
107
DRIVER INFORMATION STORAGE MEANS
104
DETECTION MEANS
101
INFORMATION ACQUISITION MEANS
102
DETERMINATION MEANS
105
MESSAGE CREATION MEANS
103
NOTIFICATION MEANS
300
500
500

Fig.6

| VEHICLE ID | DRIVER ID | DRIVING SKILL SCORE |
|---|---|---|
| 000123456 | D0000012345 | AAA |
| 000222222 | D0000234567 | C |
| : | : | : |

START
S101
DETECT VEHICLE
S102
CHECK DRIVER INFORMATION
S103
IS THIS ENTRY RESTRICTION VEHICLE?
No
Yes
S104
CREATE ENTRY RESTRICTION MESSAGE
S105
TRANSMIT ENTRY RESTRICTION MESSAGE
END
END

Fig.8

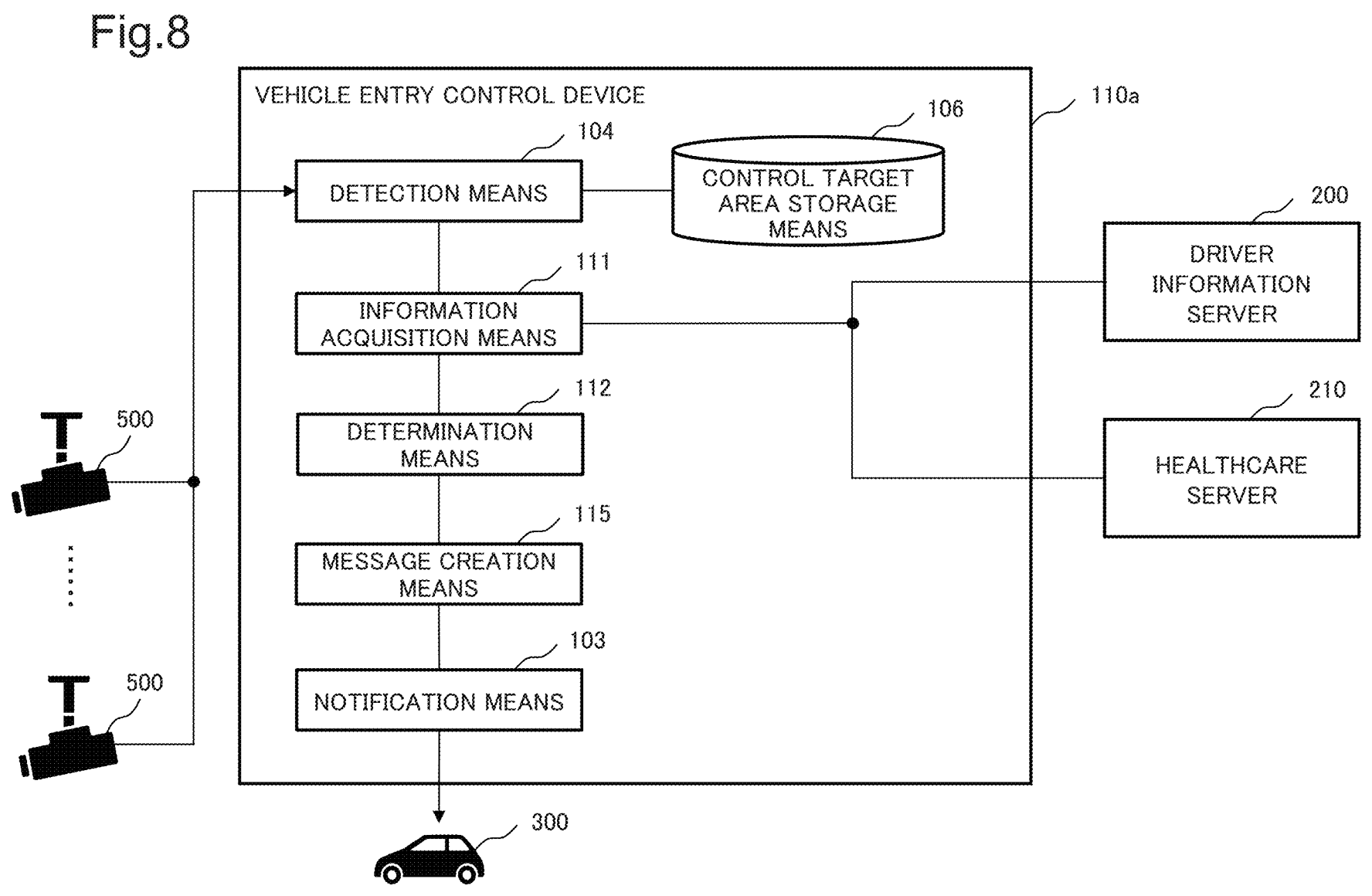

110a
VEHICLE ENTRY CONTROL DEVICE
104 DETECTION MEANS
106 CONTROL TARGET AREA STORAGE MEANS
111 INFORMATION ACQUISITION MEANS
112 DETERMINATION MEANS
115 MESSAGE CREATION MEANS
103 NOTIFICATION MEANS
200 DRIVER INFORMATION SERVER
210 HEALTHCARE SERVER
300
500
500

Fig.9

| DRIVER ID | BODY TEMPERATURE | HEART RATE | SLEEPING TIME | ... |
|---|---|---|---|---|
| D0000012345 | 37.5°C | 66 | 4 | ... |
| D0000234567 | 35.8°C | 60 | 8 | ... |
| : | : | : | : | ... |

Fig.11

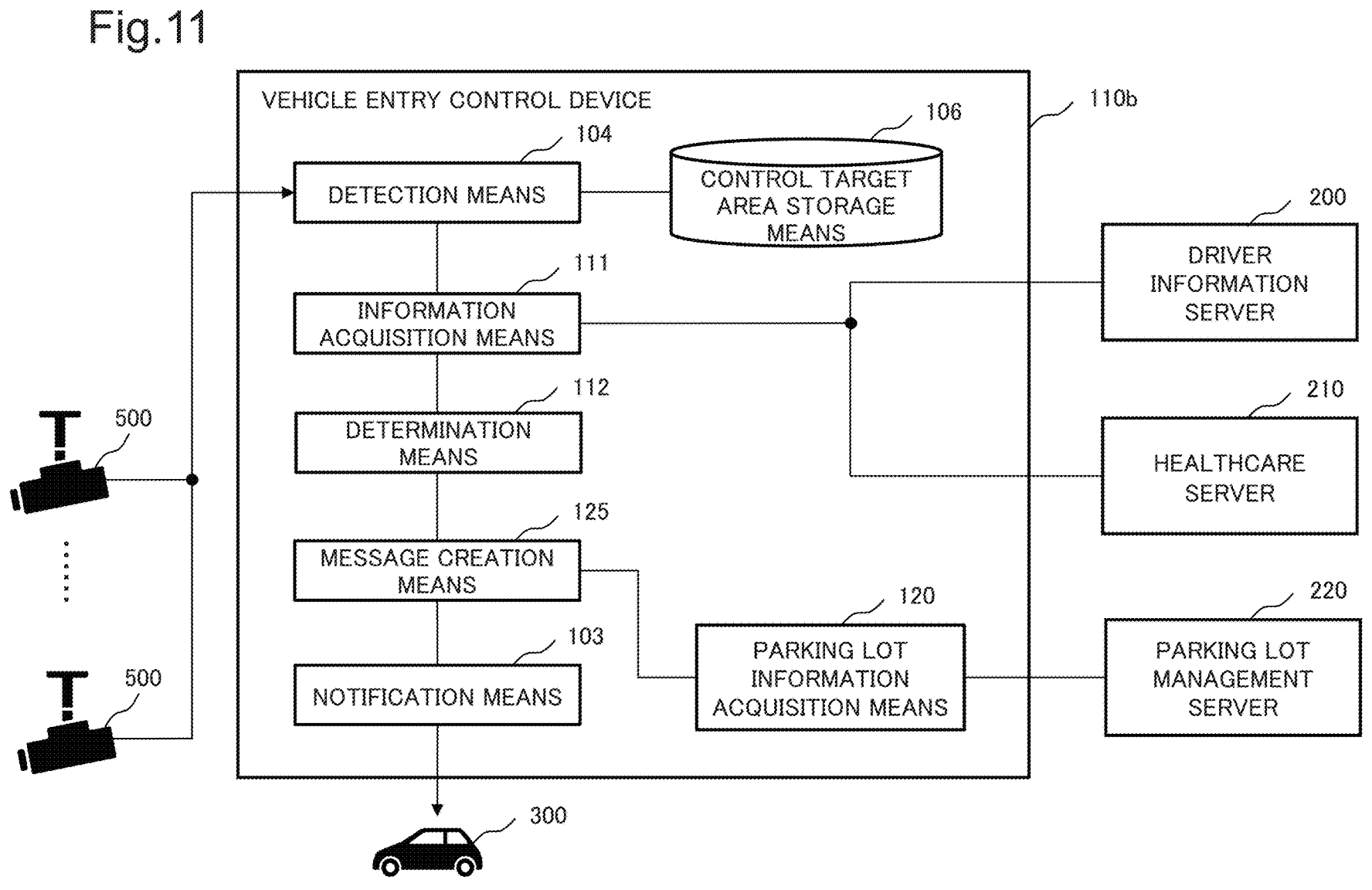

VEHICLE ENTRY CONTROL DEVICE
110b
104 DETECTION MEANS
111 INFORMATION ACQUISITION MEANS
112 DETERMINATION MEANS
125 MESSAGE CREATION MEANS
103 NOTIFICATION MEANS
106 CONTROL TARGET AREA STORAGE MEANS
120 PARKING LOT INFORMATION ACQUISITION MEANS
200 DRIVER INFORMATION SERVER
210 HEALTHCARE SERVER
220 PARKING LOT MANAGEMENT SERVER
300
500
500

900
905
904
STORAGE DEVICE
PROGRAM
911
901
CPU
903
RAM
910
INPUT/
OUTPUT
INTERFACE
902
ROM
908
COMMUNICATION
INTERFACE
907
DRIVE
DEVICE
906
909

VEHICLE ENTRY CONTROL DEVICE, VEHICLE ENTRY CONTROL METHOD, AND RECORDING MEDIUM

This application is a National Stage Entry of PCT/JP2022/007487 filed on Feb. 24, 2022, the contents of all of which are incorporated herein by reference, in their entirety.

TECHNICAL FIELD

The present invention relates to a vehicle entry control device, a vehicle entry control method, and a recording medium.

BACKGROUND ART

PTL 1 discloses a vehicle alarm device that determines whether it is necessary to output an alarm based on driving characteristic values according to safety confirmation accuracy, a driving concentration degree, and an operation aptitude of a driver in a case where it is determined that a vehicle is currently in a specific situation where an accident is likely to occur, and outputs an alarm when it is determined as being necessary to output the alarm.

PTL 2 discloses a vehicle information presenting device capable of presenting appropriate information related to a driving tendency of a driver. According to this document, the vehicle information presentation device records the driving tendency of the driver for each travel scene, and presents an appropriate recommended speed or the like for each driver according to the actual travel scene.

CITATION LIST

Patent Literature

PTL 1: JP 2002-127780 A
PTL 2: JP 2005-164470 A

SUMMARY OF INVENTION

Technical Problem

There is a need not to allow a specific vehicle such as a vehicle that may perform dangerous driving to approach a specific area such as a school zone or a narrow community road. However, in each of the devices of PTL 1 and PTL 2, there is a problem that the presence of a risk factor, a recommended speed, and the like are merely displayed to a driver who may perform dangerous driving, and it is not possible to urge these vehicles to change the course.

An object of the present invention is to provide a vehicle entry control device, a vehicle entry control method, and a recording medium capable of selectively reducing vehicles approaching a specific area.

Solution to Problem

According to a first aspect, there is provided a vehicle entry control device including information acquisition means for acquiring driver information that is information indicating a driving tendency of a driver of a vehicle approaching a predetermined control target area, determination means for determining whether the vehicle is a target vehicle of entry restriction to a control target area based on the driver information, and notification means for notifying the vehicle determined as the target vehicle of entry restriction of information for preventing entry into the control target area.

According to a second aspect, there is provided a vehicle entry control method including acquiring driver information that is information indicating a driving tendency of a driver of a vehicle approaching a predetermined control target area, determining whether the vehicle is a target vehicle of entry restriction to a control target area based on the driver information, and notifying the vehicle determined to be the target vehicle of entry restriction of information for preventing entry into the control target area.

According to a third aspect, there is provided a computer-readable recording medium that records a program causing a computer to execute a process of acquiring driver information that is information indicating a driving tendency of a driver of a vehicle approaching a predetermined control target area, a process of determining whether the vehicle is a target vehicle of entry restriction to a control target area based on the driver information, and a process of notifying the vehicle determined to be the target vehicle of entry restriction of information for preventing entry into the control target area.

Advantageous Effects of Invention

According to the present invention, a vehicle entry control device, a vehicle entry control method, and a recording medium capable of selectively reducing vehicles approaching a specific area are provided.

BRIEF DESCRIPTION OF DRAWINGS

FIG. 6 is a view illustrating an example of driver information retained by a vehicle entry control device according to the first example embodiment of the present invention.

FIG. 8 is a view illustrating a configuration of a second example embodiment of the present invention.

FIG. 9 is a view illustrating an example of second driver information acquired from a healthcare server by a vehicle entry control device according to the second example embodiment of the present invention.

FIG. 11 is a view illustrating a configuration of a third example embodiment of the present invention.

EXAMPLE EMBODIMENT

Figure 1:
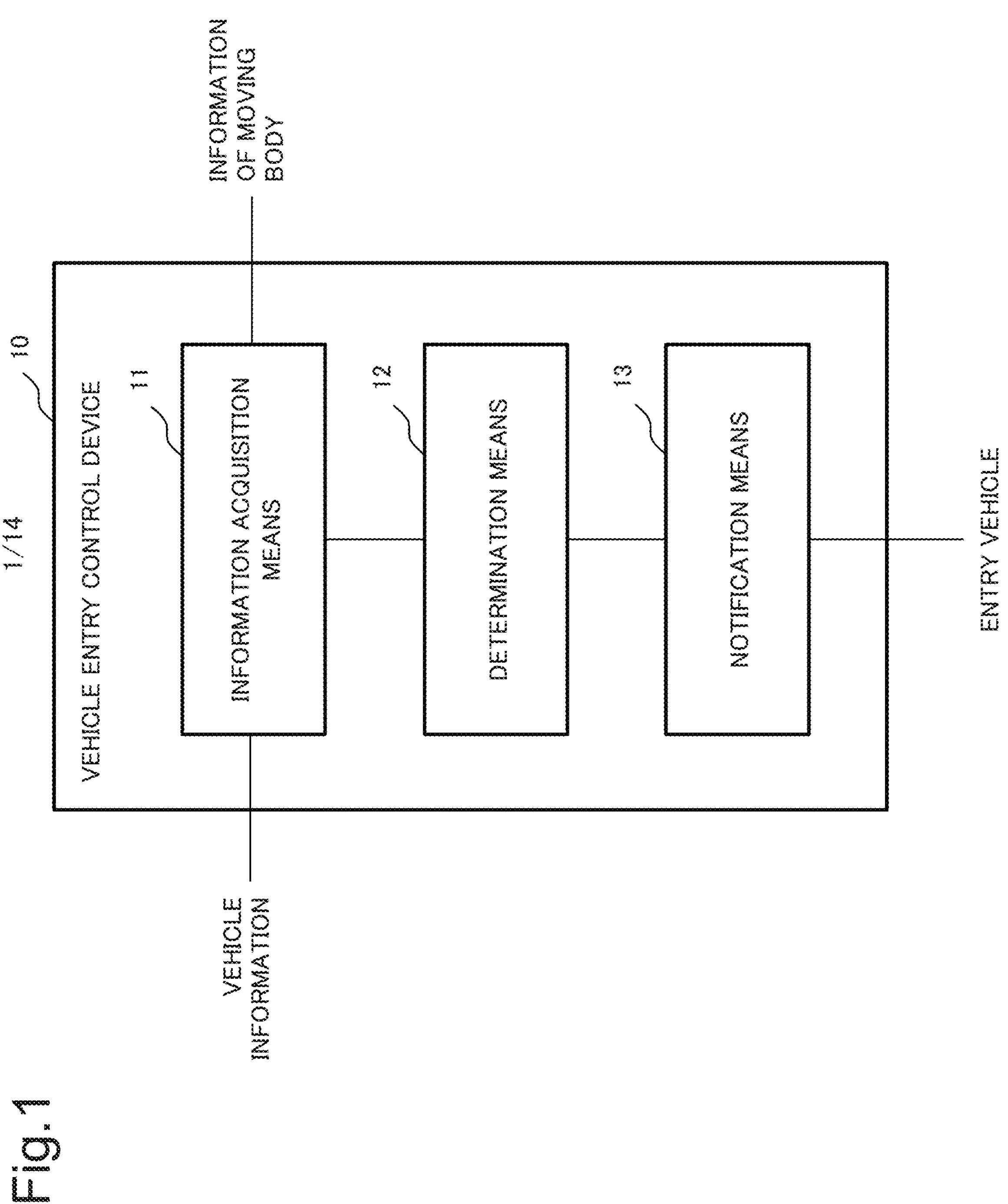
FIG. 1 is a view illustrating a configuration of an example embodiment of the present invention.

First, an outline of an example embodiment of the present invention will be described with reference to the drawings. The reference numerals in the drawings attached to this outline are attached to each element for convenience as an example for assisting understanding, and are not intended to limit the present invention to illustrated aspects. Connection lines between blocks in the drawings and the like referred to in the following description include both bidirectional and unidirectional lines. A unidirectional arrow schematically indicates a flow of a main signal (data), and does not exclude bidirectionality. A program is executed via a computer device, and the computer device includes, for example, a processor, a storage device, an input device, a communication interface, and a display device as necessary. The computer device is configured to be able to communicate with a device (including a computer) inside or outside the device via a communication interface regardless of wired or wireless. Although there are ports and interfaces at connection points of input and output of each block in the drawing, illustration thereof is omitted.

In one example embodiment of the present invention, as illustrated in FIG. 1, the present invention can be achieved by a vehicle entry control device 10 including information acquisition means 11, determination means 12, and notification means 13.

More specifically, the information acquisition means 11 acquires first driver information that is information indicating a driving tendency of a driver of a vehicle approaching a predetermined control target area. As the first driver information, various types of information indicating a driver's driving tendency (statistics based on past data), a driving history, an age, a type of a driver's license, and a driver's driving tendency such as a past accident history can be used. Whether the predetermined control target area is approached can be detected, for example, by providing a camera or a sensor in front of the predetermined control target area.

The determination means 12 determines whether the vehicle is a target vehicle of entry restriction to the control target area based on the first driver information. For example, the determination means 12 determines a vehicle driven by a driver having a large accident history as a target vehicle of entry restriction.

The notification means 13 notifies the vehicle determined to be the target vehicle of entry restriction of information for preventing entry into the control target area.

Figure 2:
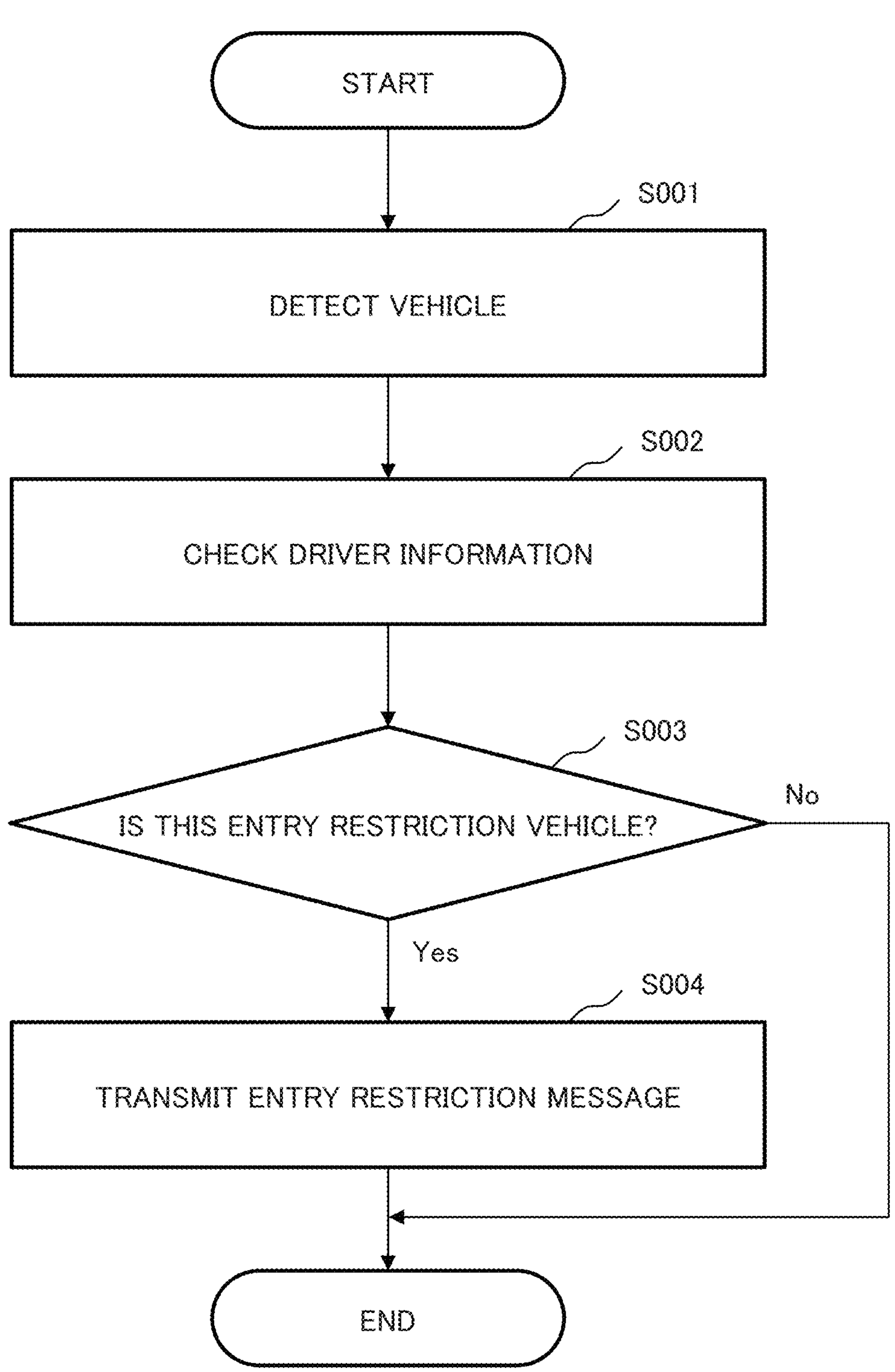
FIG. 2 is a flowchart illustrating an operation of the example embodiment of the present invention.

FIG. 2 is a flowchart illustrating an operation of the example embodiment of the present invention. Referring to FIG. 2, first, the vehicle entry control device 10 detects a vehicle that has passed a predetermined check point (step S001). The detection of the vehicle may be performed by the vehicle entry control device 10, but the vehicle may be detected by another device. In this case, the vehicle entry control device 10 receives a result of detecting the vehicle from the another device.

Next, the vehicle entry control device 10 acquires and confirms the first driver information that is information indicating the detected driving tendency of the driver of the vehicle (step S002). As a method of acquiring the first driver information, for example, a method of reading license plate information of the detected vehicle and determining the driver from the license plate information can be adopted.

Next, the vehicle entry control device 10 determines whether the vehicle is a target vehicle of entry restriction to the control target area based on the acquired first driver information (step S003). Here, when it is determined that the vehicle is not a target of entry restriction into the control target area, the vehicle entry control device 10 omits the subsequent processing (No in step S003).

On the other hand, when it is determined that the vehicle is a target of entry restriction to the control target area, the vehicle entry control device 10 transmits an entry restriction message to the vehicle (step S004).

Figure 3:
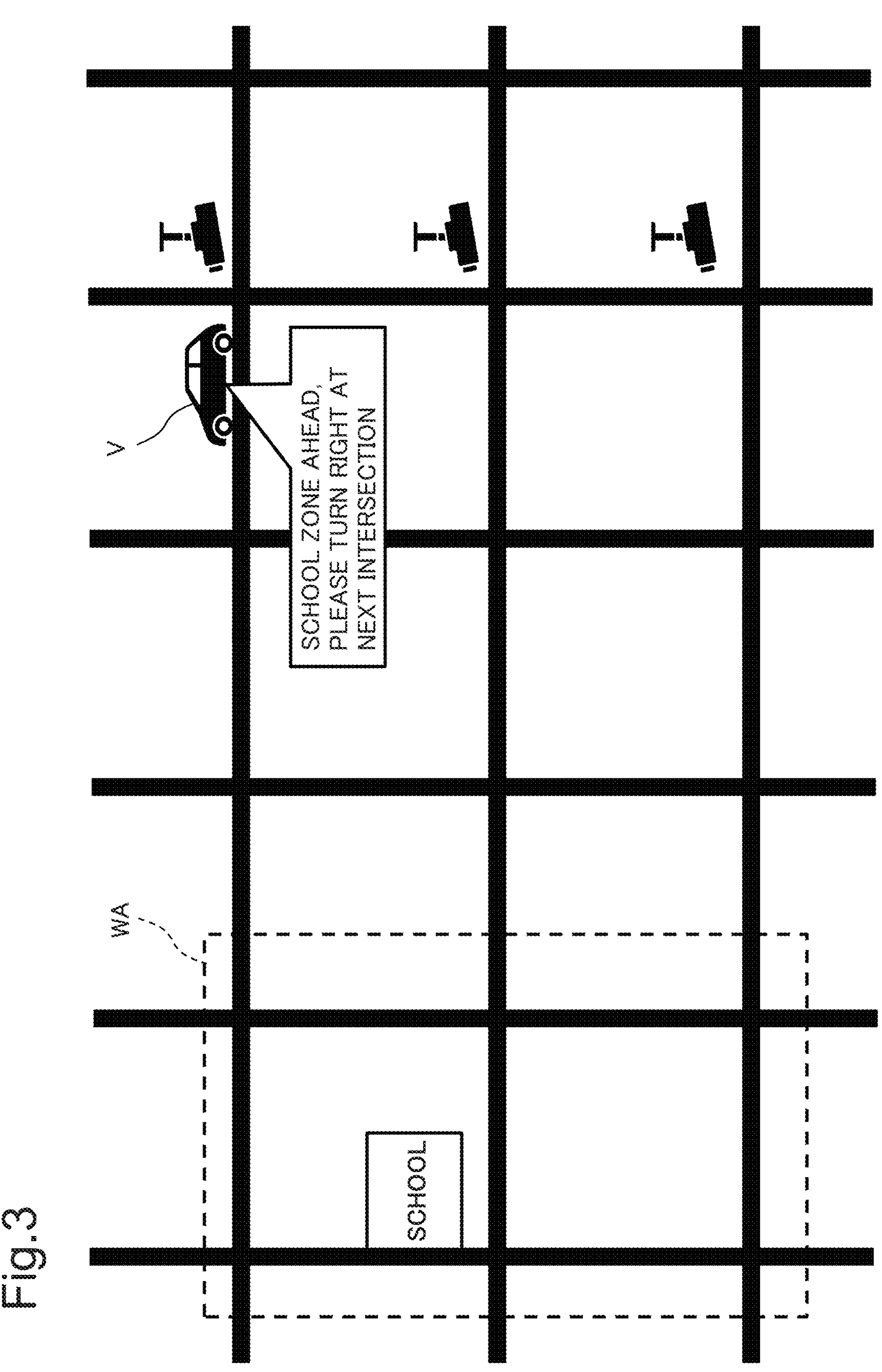
FIG. 3 is a view illustrating an operation example of the example embodiment of the present invention.
Figure 4:
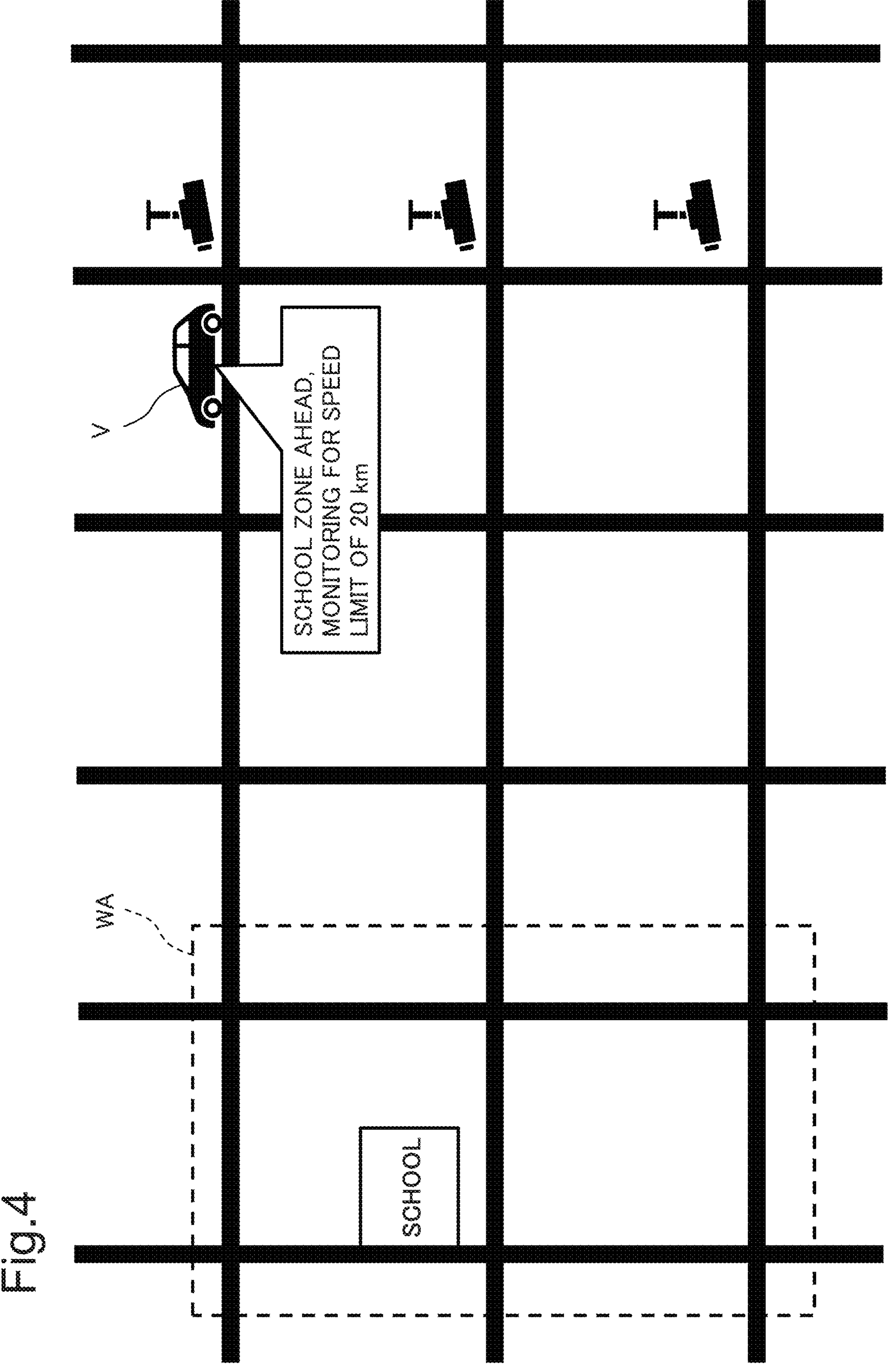
FIG. 4 is a view illustrating another operation example of the example embodiment of the present invention.

Here, the content of the entry restriction message transmitted from the vehicle entry control device 10 to the vehicle can adopt various modes. FIG. 3 and FIG. 4 are views illustrating examples of entry restriction messages in a case where the control target area is a school zone. For example, as illustrated in FIG. 3, the vehicle entry control device 10 transmits, to the vehicle V, an entry restriction message giving an instruction to change the course before a control target area WA. In this way, it is possible to selectively reduce vehicles approaching the control target area WA. In the example of FIG. 3, presence of a school zone and change of the course are given in the instruction, but a mode of the entry restriction message is not limited thereto. For example, "no passage except for residents" or the like may be given in notification according to the content of regulation in the school zone.

The entry restriction message may not be a content that causes the target vehicle V to directly stop approaching the control target area WA. For example, as illustrated in FIG. 4, notification of speed limit information applied in the control target area WA can also prompt the target vehicle V to change the course. In the example of FIG. 4, the presence of the school zone, the speed limit information, and the fact of being monitored are given in notification, but the mode of the entry restriction message is not limited to the mode in FIG. 4. For example, it is also possible to selectively reduce vehicles approaching the control target area WA by transmitting an entry restriction message notifying the vehicles of a decrease in a width in the school zone, the presence of humps, or the like.

When a vehicle that is a target of the entry restriction message is a vehicle equipped with an automatic driving mode or a driving assistance mode, the entry restriction message may notify the vehicle of a notice of change of the automatic driving level or the driving assistance mode. For example, in the school zone, safety of the pedestrian can be secured by changing the automatic driving level or the driving assistance mode to a safer level for the pedestrian. On the other hand, a driver who does not desire such a change of the automatic driving level or the driving assistance mode changes the course in order to avoid traveling in the school zone. As described above, the number of vehicles approaching the control target area WA can be also selectively reduced by transmitting the entry restriction message notifying vehicles of the notice of change of the automatic driving level or the driving assistance mode.

First Example Embodiment

Figure 5:
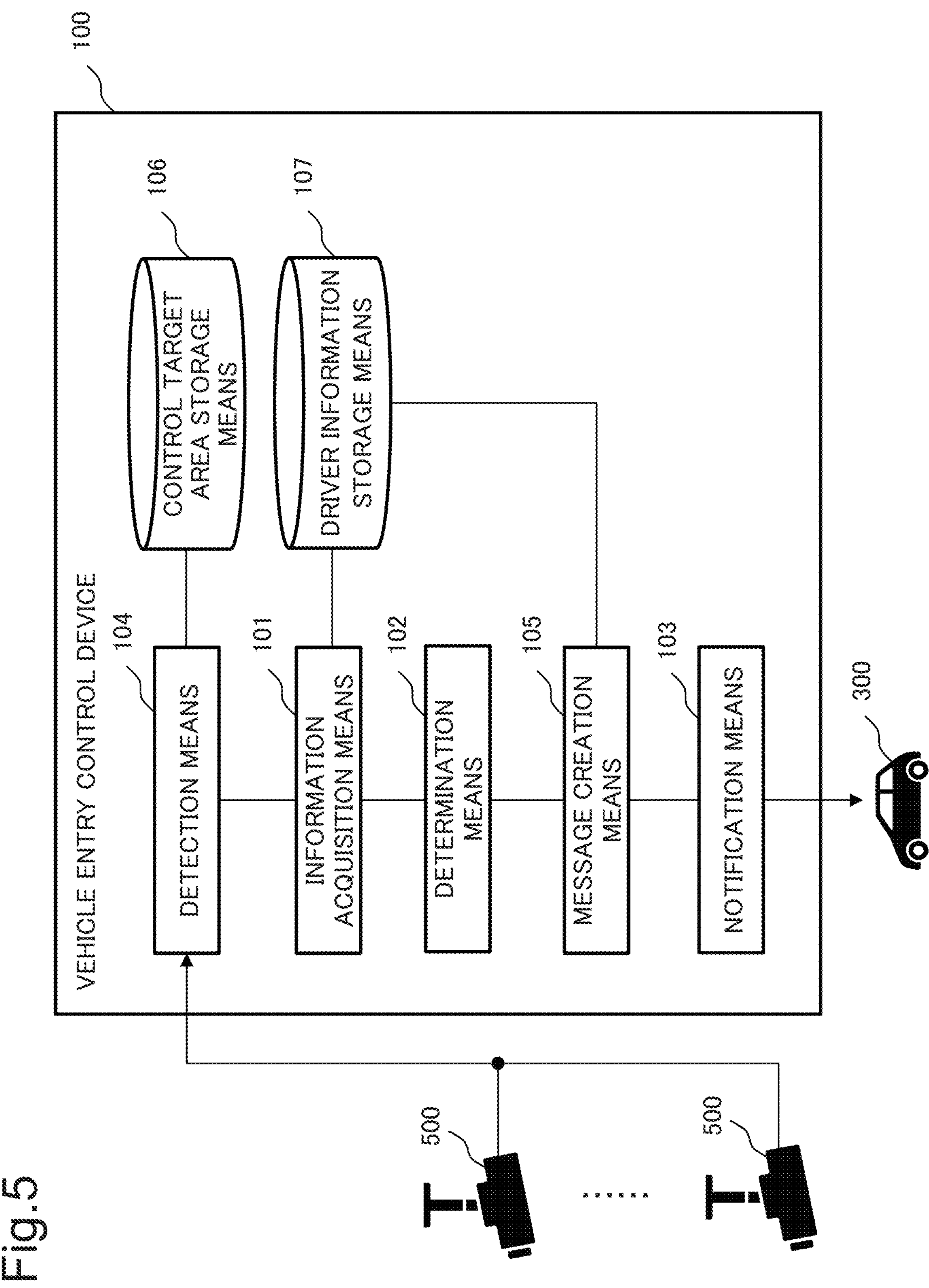
FIG. 5 is a view illustrating a configuration of a first example embodiment of the present invention.

Next, a first example embodiment of the present invention will be described in detail with reference to the drawings. FIG. 5 is a view illustrating a configuration of the first example embodiment of the present invention. Referring to FIG. 5, a configuration including one or more cameras 500, a vehicle entry control device 100, and a vehicle 300 that is a transmission destination of the entry restriction message is illustrated.

Each of the cameras 500 is installed in front of an area where entry of a vehicle is to be restricted (control target area), and captures an image of the vehicle heading for the control target area. As the camera 500, various security cameras or traffic flow monitoring cameras installed near intersections or roads can also be used.

The vehicle entry control device 100 includes detection means 104, information acquisition means 101, determination means 102, message creation means 105, notification means 103, control target area storage means 106, and driver information storage means 107.

The control target area storage means 106 stores a relationship between the control target area and a position, an orientation, and the like of the camera 500 installed around the control target area. The control target area storage means 106 can be omitted in a case where there is only one entry path in the control target area and the vehicle that has passed in front of the camera always travels toward the control target area.

Based on an image acquired from the camera 500 and the information stored in the control target area storage means 106, the detection means 104 detects a vehicle heading in the direction of the control target area and acquires information that can specify a driver of the vehicle. As the information that can specify the driver, license plate information of the vehicle, identification information of an in-vehicle terminal mounted on the vehicle, identification information of a mobile terminal carried by the driver, and the like can be used.

The information acquisition means 101 acquires first driver information that is information indicating a driving tendency of the driver from the driver information storage means 107 by using the information that has been acquired by the detection means 104 and can specify the driver of the vehicle.

FIG. 6 is a view illustrating an example of the first driver information retained in the driver information storage means 107. In the example in FIG. 6, a vehicle ID, a driver ID, and a driving skill score of the driver are stored in association with each other. Either the vehicle ID or the driver ID can be used as the information that can specify the driver of the vehicle as described above. As the driving skill score, for example, it is possible to preferably use a score calculated by using a calculation formula or the like that comprehensively evaluates a driver's driving tendency (statistics based on past data), an age, a type of driver's license, a past accident history, a violation history of traffic regulations, and the like. In the example in FIG. 6, it is assumed that AAA has the highest driving skill score, and then AA, A, B, and C are ranked in this order as the driving skill decreases. Of course, instead of the driving skill score, any one of the driving history, the age, the type of the driver's license, the past accident history, the violation history of traffic regulations, and the like may be used as a simple driving skill score.

The information retained in the driver information storage means 107 is preferably updated to the latest state as needed. For example, a combination of the vehicle ID and the driver ID is preferably transmitted from the in-vehicle terminal or the like to the vehicle entry control device 100 or a host device thereof when the driver gets on the vehicle. This facilitates specifying of the driver from the vehicle ID. It is preferable that the driving skill score is updated to the latest one based on the latest driver's driving tendency, a situation of violation of traffic regulations, and the like.

Therefore, in addition to a mode in which the vehicle entry control device 100 includes the driver information storage means 107, a mode in which the vehicle entry control device 100 acquires the latest driver information from an external device including the driver information storage means 107 can also be adopted. As such an external device, it is also possible to use a system server of a company that provides a telematics service that collects and accumulates data transmitted from a vehicle.

The determination means 102 determines whether the vehicle detected by the detection means 104 is a target vehicle of entry restriction to the control target area based on the driver information. For example, the determination means 102 determines vehicles whose driving skill scores are B and C as target vehicles of entry restriction.

The message creation means 105 creates an entry restriction message based on the first driver information when the determination means 102 determines that the vehicle is a target vehicle of entry restriction to the control target area. At this time, the message creation means 105 may change the content of the entry restriction message based on the driving skill score included in the first driver information. For example, the message creation means 105 may instruct the vehicle driven by a driver whose driving skill score is C to change the course in a stronger expression than the vehicle driven by the driver whose driving skill score is B.

The notification means 103 notifies the vehicle determined to be the target vehicle of entry restriction of information for preventing entry into the control target area. As a method by which the notification means 103 transmits the entry restriction message to the vehicle approaching the control target area, it is possible to adopt a method in which the information for identifying the notification target vehicle is included in the entry restriction message and broadcast, and the vehicle side identifies that it is the notification to the host vehicle. In a case where the entry restriction message is transmitted to the notification target vehicle by broadcast, from the viewpoint of privacy protection and the like, a transmission destination can be designated by using a temporary ID created in advance and distributed to the vehicle side. In this case, it is preferable that the notification means 103 does not include information that can specify an individual or a vehicle in the entry restriction message body. Alternatively, it is also possible to adopt a method in which the notification means 103 encrypts and transmits the entry restriction message by using an encryption key set for each vehicle in such a way that only the notification target vehicle can decrypt the encrypted entry restriction message.

As another method of transmitting the entry restriction message by the notification means 103, a method of directly transmitting the entry restriction message to the vehicle in a unicast manner can also be adopted. In this case, a communication address and the like of the vehicle may be stored in the driver information storage means 107 in advance. As an output mode of the entry restriction message on the vehicle side, in addition to display on a display device of the in-vehicle terminal, various modes such as output by voice and projection onto a windshield can be adopted.

Figure 7:
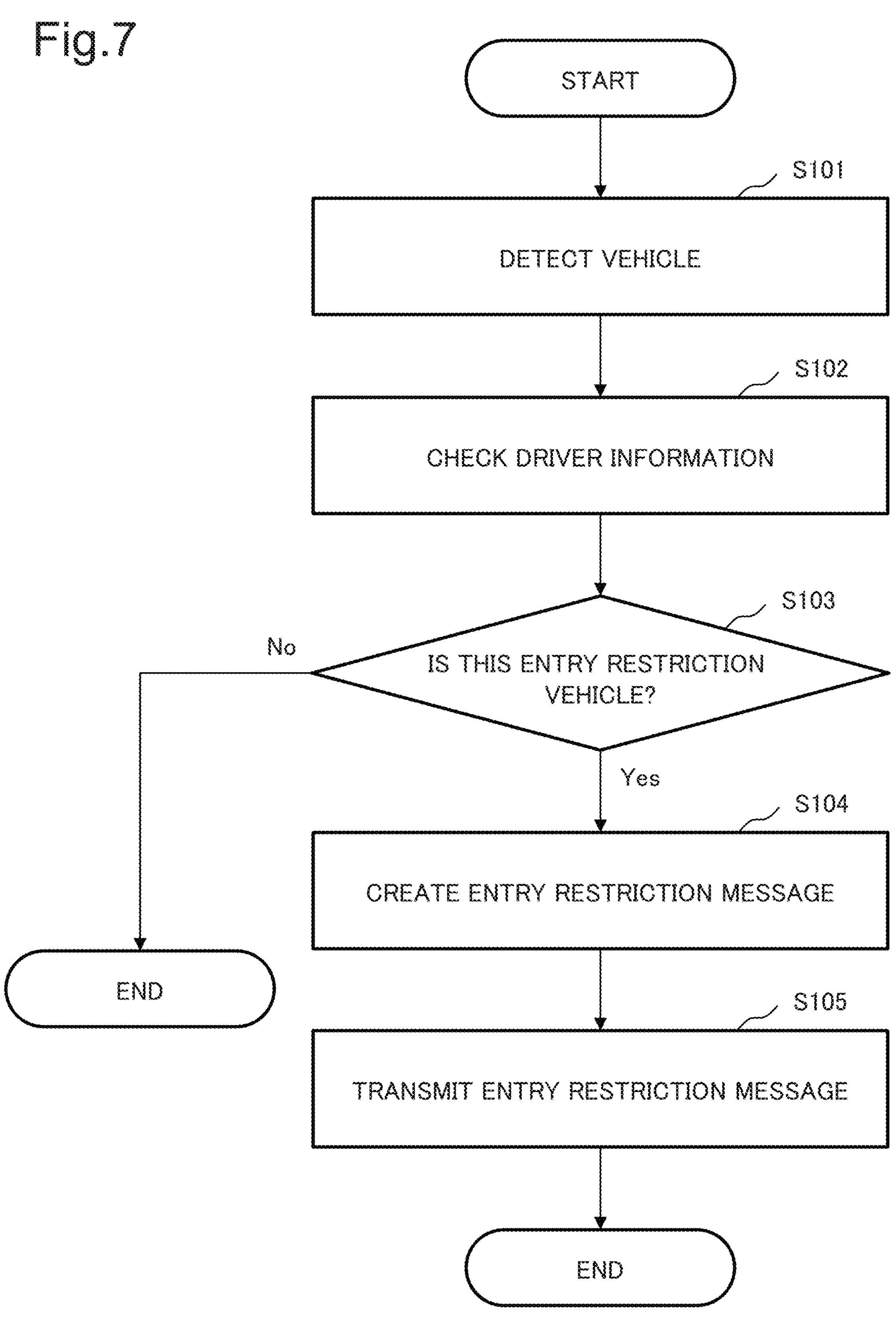
FIG. 7 is a flowchart illustrating an operation of the vehicle entry control device according to the first example embodiment of the present invention.

Next, an operation of the present example embodiment will be described in detail with reference to the drawings. FIG. 7 is a flowchart illustrating an operation of the vehicle entry control device 100 according to the first example embodiment of the present invention. Referring to FIG. 7, first, the vehicle entry control device 100 detects a vehicle heading for the control target area from image data of the camera 500 (step S101).

Next, the vehicle entry control device 100 reads the driver information from the driver information storage means 107 based on the vehicle ID such as detected license plate information of the vehicle or the driver ID, and checks the driving skill score (step S102).

Next, the vehicle entry control device 100 determines whether the detected vehicle is a target vehicle of entry restriction based on whether the driving skill score is equal to or less than a predetermined standard (step S103).

When it is determined that the detected vehicle is not a target of entry restriction (No in step S103), the vehicle entry control device 100 stops the subsequent processing. On the other hand, when determining that the detected vehicle is a target of entry restriction (Yes in step S103), vehicle entry control device 100 creates an entry restriction message (step S104).

Finally, the vehicle entry control device 100 transmits an entry restriction message to the vehicle determined as a target vehicle of entry restriction (step S105).

The entry restriction message as described above is output in a form of display on a display device, sound output, projection onto a windshield, or the like on the vehicle side. When a driver who has received the entry restriction message changes a course or the like, it is possible to prevent a vehicle driven by a driver with low driving skills from approaching the control target area.

Second Example Embodiment

Next, a second example embodiment in which the vehicle entry control device refers to information indicating a health condition of a driver managed by an external server as second driver information will be described in detail with reference to the drawings. FIG. 8 is a view illustrating a configuration of the second example embodiment of the present invention. A first difference from the first example embodiment illustrated in FIG. 5 is that information acquisition means 111 of a vehicle entry control device 110*a* is configured to acquire the first driver information and the second driver information from a driver information server 200 and a healthcare server 210 instead of the driver information storage means 107. A second difference is that determination means 112 refers to both the first driver information and the second driver information to determine whether a detected vehicle is a target vehicle to be inhibited from approaching the control target area. A third difference is that message creation means 115 creates the entry restriction message by using both the first driver information and the second driver information. Since the other configurations are similar to those of the first example embodiment, differences thereof will be mainly described below.

Similarly to the driver information storage means 107, the driver information server 200 retains the first driver information of the driver, and provides the first driver information in response to a request from the vehicle entry control device 100*a*. As the driver information server, a system server of a company that provides telematics services for collecting and accumulating data from the vehicle can also be used.

The healthcare server 210 retains information regarding a health condition of a driver (second driver information), and provides the second driver information in response to a request from the vehicle entry control device 100*a*. FIG. 9 is a view illustrating an example of the second driver information held in the healthcare server 210. In the example in FIG. 9, a body temperature, a heart rate, sleep time of the previous day, and the like are recorded for each driver. Such data can be collected from various healthcare devices equipped with an application program for health management or a communication function mounted on a smartphone, a smart watch, or the like.

The information acquisition means 112 of the present example embodiment acquires the first driver information and the second driver information from the driver information server 200 and the healthcare server 210, respectively, and transmits the first driver information and the second driver information to the determination means 112.

The determination means 112 determines whether the vehicle detected by the detection means 104 is a target vehicle of entry restriction to the control target area based on the first driver information and the second driver information. For example, the determination means 102 determines the following vehicles as target vehicles for entry restriction.

- Vehicle in which the driving skill score is C
- Vehicle in which the driving skill score is B and driver's health condition is bad
- Vehicle in which driver's health condition is extremely bad Whether the driver's health condition is bad or extremely bad can be determined under a predetermined condition. Very simply, for example, by setting a condition that the body temperature or the heart rate is equal to or greater than a predetermined threshold value or the sleeping time is shorter than a predetermined time, it is possible to determine whether the health condition of the driver is bad or extremely bad. Of course, it is also possible to adopt a method of acquiring more detailed information as the second driver information and comprehensively determining the health condition by artificial intelligence (AI) or the like by using these pieces of information.

The message creation means 115 creates an entry restriction message based on the first driver information and the second driver information when the determination means 102 determines that the vehicle is a target vehicle of entry restriction to the control target area. At this time, the message creation means 115 creates the entry restriction message based on the first driver information and the second driver information. For example, the message creation means 115 creates the entry restriction message referring to the health condition for a vehicle driven by a driver in an unhealthy state.

Figure 10:
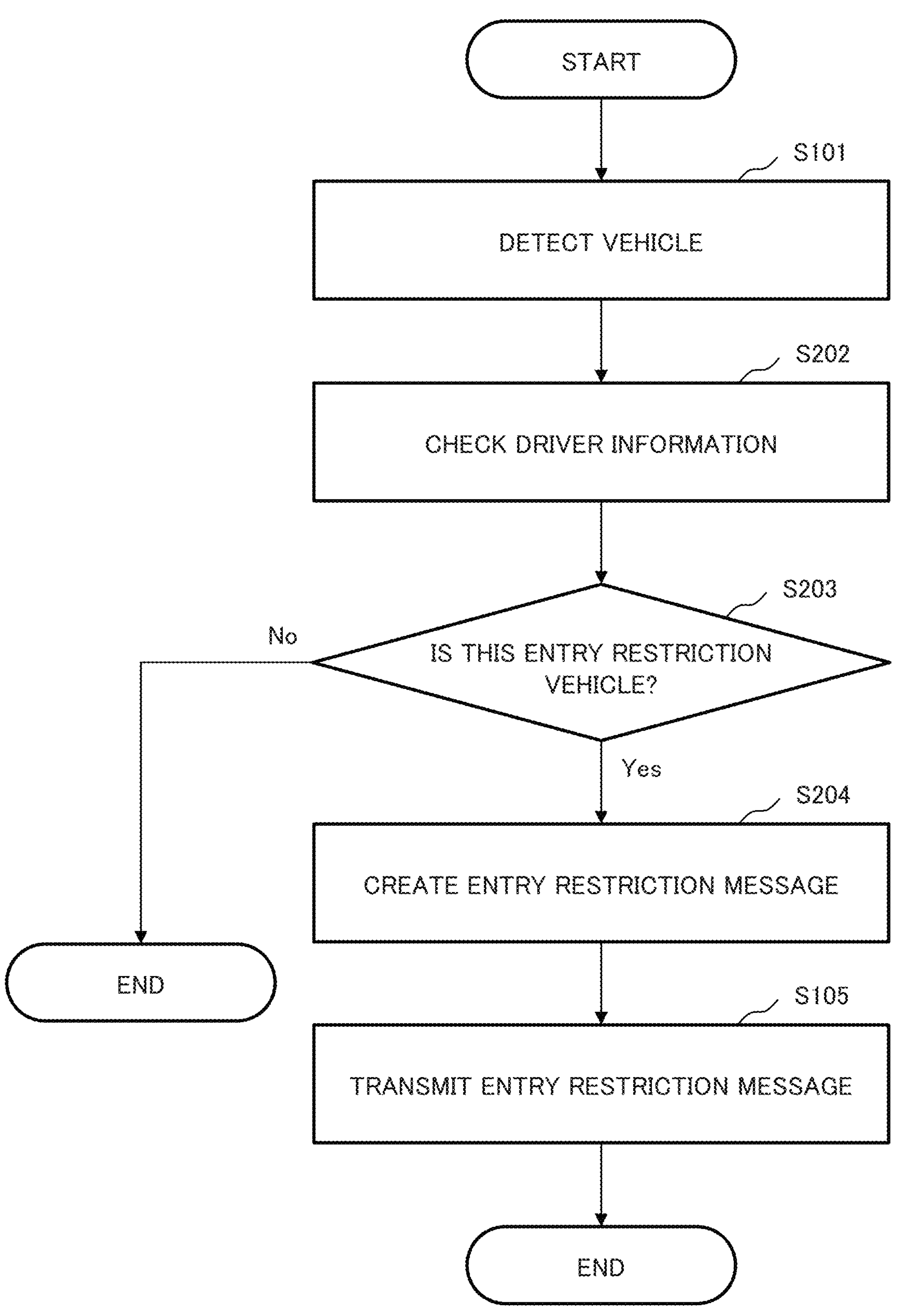
FIG. 10 is a flowchart illustrating an operation of the vehicle entry control device according to the second example embodiment of the present invention.

Next, an operation of the present example embodiment will be described in detail with reference to the drawings. FIG. 10 is a flowchart illustrating an operation of the vehicle entry control device 100*a* according to the second example embodiment of the present invention. Steps S101 and S105 in FIG. 10 are the same as those in the first example embodiment, and thus description thereof is omitted.

After detecting the vehicle in step S101, the vehicle entry control device 100*a* acquires the first driver information and second driver information from the driver information server 200 and the healthcare server 210 based on the vehicle ID such as the detected license plate information of the vehicle or the driver ID. Then, the vehicle entry control device 100*a* checks whether the detected vehicle is a target vehicle of entry restriction based on the first driver information and the second driver information (step S202).

As a result of the checking, when it is determined that the detected vehicle is not a target of entry restriction (No in step S203), the vehicle entry control device 100*a* stops the subsequent processes. On the other hand, when it is determined that the detected vehicle is a target of entry restriction (Yes in step S203), vehicle entry control device 100*a* creates an entry restriction message with reference to the first driver information and the second driver information (step S204).

For example, with respect to a driver in poor health condition, the vehicle entry control device 100*a* creates entry restriction message "There is heat (body temperature exceeds XX° C.). There is a school zone ahead, please change a course".

Finally, the vehicle entry control device 100*a* transmits an entry restriction message to the vehicle determined as a target vehicle of entry restriction (step S105).

According to the vehicle entry control device 100*a* that operates as described above, it is possible to prevent a vehicle driven by a driver with low driving skills and a driver with poor health condition from approaching the control target area.

Third Example Embodiment

Next, a third example embodiment in which the vehicle entry control device presents alternative transportation means will be described in detail with reference to the drawings. FIG. 11 is a view illustrating a configuration of the third example embodiment of the present invention. A difference from the second example embodiment illustrated in FIG. 8 is that parking lot information acquisition means 120 is added to a vehicle entry control device 110*b*, and message creation means 125 creates an entry restriction message including vacancy information of a parking lot. Since the other configurations are similar to those of the second example embodiment, differences thereof will be mainly described below.

A parking lot management server 220 is a server that manages availability of parking lots including a parking lot around the control target area. As such a server, a parking lot management company, a parking lot management server of a local government, or the like can be used.

The parking lot information acquisition means 120 acquires vacancy information of a parking lot set in advance as a parking lot around the control target area among parking lots managed by the parking lot management server 220.

The message creation means 125 creates an entry restriction message based on the first driver information and the second driver information when the determination means 112 determines that the vehicle is a target vehicle of entry restriction to the control target area. At this time, the message creation means 125 creates an entry restriction message that presents alternative transportation means that can be adopted by a driver of the vehicle. Further, the message creation means 125 of the present example embodiment includes the vacancy information of the parking lot obtained from the parking lot information acquisition means 120 in the entry restriction message. The alternative transportation means that can be adopted by the driver of the vehicle may be selected in advance based on a position, a direction (traveling direction), a time zone, destination information obtained from the driver information server 200, and the like of the vehicle. Of course, there may be no alternative transportation means depending on the position, the direction (traveling direction), the time zone, and the destination of the vehicle. In this case, similarly to the first and second example embodiments, change of the course or the speed limit information may be presented. In addition, when there are a plurality of kinds of alternative transportation means, the message creation means 125 may create an entry restriction message including the plurality of kinds of alternative transportation means. In a case where there are the plurality of kinds of alternative transportation means, the message creation means 125 may estimate a destination of the vehicle from the position, the direction (traveling direction), and the like of the vehicle, and create an entry restriction message that presents alternative transportation means suitable for movement to the destination.

Figure 12:
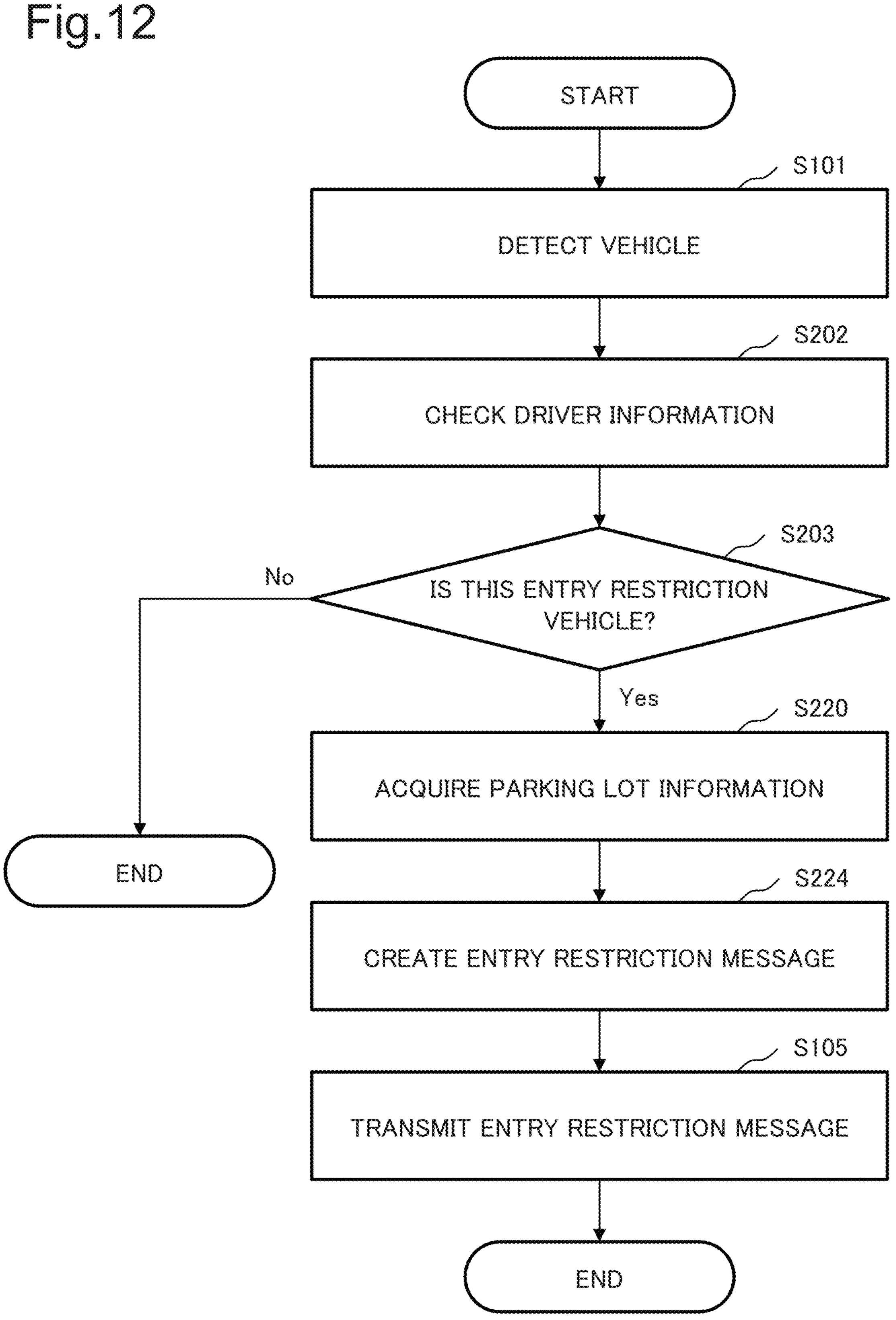
FIG. 12 is a flowchart illustrating an operation of the vehicle entry control device according to the third example embodiment of the present invention.

Next, an operation of the present example embodiment will be described in detail with reference to the drawings. FIG. 12 is a flowchart illustrating an operation of the vehicle entry control device 100*b* according to the third example embodiment of the present invention. Steps S101 and S203 in FIG. 10 are the same as those in the second example embodiment, and thus description thereof is omitted.

When it is determined that the vehicle detected in step S203 is a target of entry restriction (Yes in step S203), the vehicle entry control device 100*b* acquires, from the parking lot management server 220, vacancy information on parking lots around the control target area (step S220).

The vehicle entry control device 100*b* creates an entry restriction message with reference to the first driver information and the second driver information (step S224). For example, the vehicle entry control device 100*b* creates an entry restriction message including alternative transportation means and vacancy information of a parking lot for a driver with a significantly poor health condition.

Finally, the vehicle entry control device 100*a* transmits an entry restriction message to the vehicle determined as a target vehicle of entry restriction (step S105). That is, the notification means 103 notifies the driver of the vehicle whose entry is to be inhibited of available parking lot information, and urges the driver to move by alternative transportation means using the parking lot.

Figure 13:
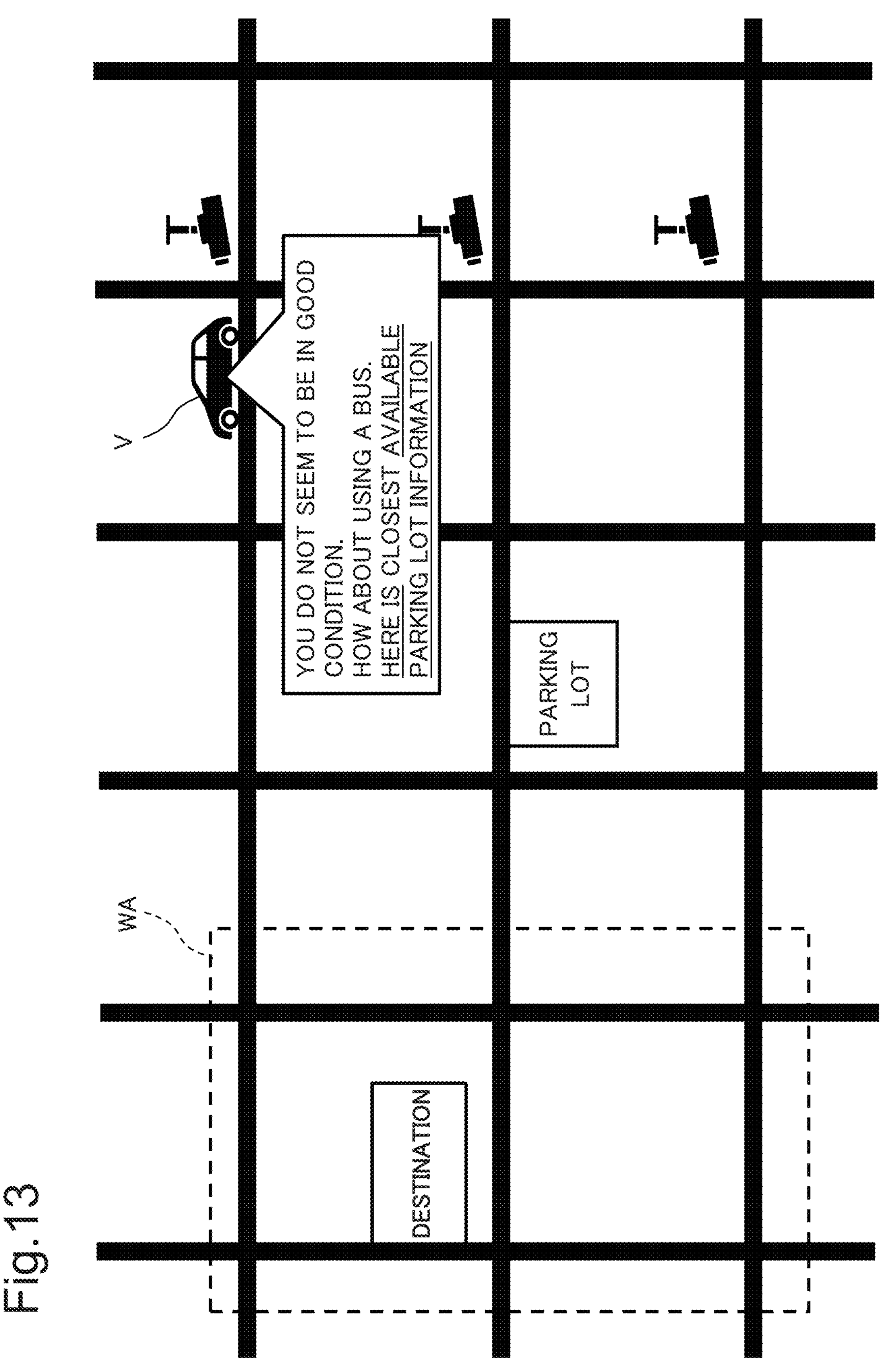
FIG. 13 is a view illustrating an operation example of the vehicle entry control device according to the third example embodiment of the present invention.

FIG. 13 is a view illustrating an operation example of the vehicle entry control device 100*b* of the present example embodiment. In the example in FIG. 13, the vehicle entry control device 100*b* notifies the vehicle determined to be the entry restriction target vehicle of an entry restriction message "You do not seem to be in good physical condition. How about using a bus? Here is the closest available parking lot information". By encouraging the driver who has viewed such an entry restriction message to switch to movement by the alternative transportation means, it is possible to prevent the corresponding vehicle from approaching the control target area.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, the network configuration, the configuration of each element, and the representation form of data illustrated in the drawings are examples for assisting the understanding of the present invention, and are not limited to the configurations illustrated in the drawings.

For example, in the examples of FIGS. 3 and 4 described above, the control target area is the school zone, but the area to be controlled by the vehicle entry control device of the present invention is not limited to the school zone. For example, it is possible to set, as the control target area, an area with many tourists traveling on foot, a shopping street, or an area around the shopping street.

(Regarding Hardware Configuration)

Figure 14:
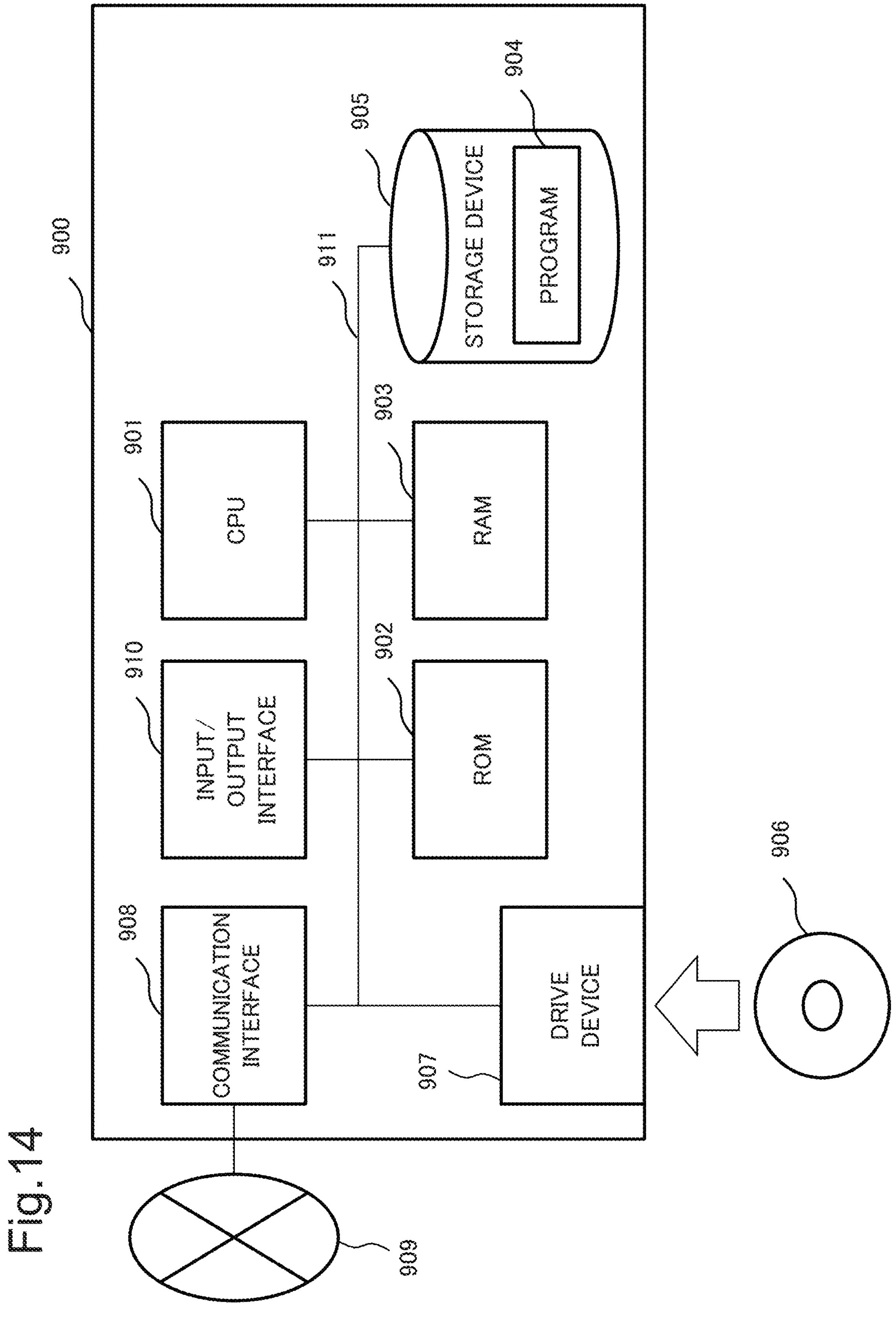
FIG. 14 is a view illustrating a configuration of a computer constituting the vehicle entry control device of the present invention.

In each example embodiment of the present disclosure, each constituent element of each device indicates a block of a functional unit. A part or all of constituent elements of each device is implemented by, for example, any combination of the information processing apparatus 900 and a program as illustrated in FIG. 14. FIG. 14 is a block diagram illustrating an example of a hardware configuration of the information processing apparatus 900 that implements each constituent element of each device. The information processing apparatus 900 includes the following configuration as an example.

CPU (Central Processing Unit) 901
ROM (Read Only Memory) 902
RAM (Random Access Memory) 903
Program 904 loaded to RAM 903
Storage 905 device storing program 904
Drive 907 device for reading and writing data from and to recording medium 906
Communication interface 908 connected to communication network 909
Input/output interface 910 for inputting and outputting data
Bus 911 connecting respective constituent elements Each constituent element of each device in each example embodiment is achieved by the CPU 901 acquiring and executing the program 904 that implements these functions. That is, the CPU 901 in FIG. 14 may execute a vehicle detection program and a determination program to perform update processing of each calculation parameter stored in the RAM 903, the storage device 905, or the like. The program 904 for implementing a function of each constituent element of each device is stored, for example, in the storage device 905 or the ROM 902 in advance and is read by the CPU 901 as necessary. The program 904 may be supplied to the CPU 901 via the communication network 909, or may be stored in advance in the recording medium 906, and the drive device 907 may read the program and supply the program to the CPU 901.

The program 904 can display a processing result including an intermediate state for each stage via the display device as necessary, or can communicate with the outside via the communication interface. The program 904 can be recorded on a computer-readable (non-transitory) recording medium.

There are various modifications of the implementation method of each device. For example, each device may be implemented by any combination of an information processing apparatus 900 and a program different for each constituent element. A plurality of constituent elements included in each device may be implemented by any combination of one information processing apparatus 900 and a program. That is, each unit (processing means, function) of the attention area notification system described in the first to third example embodiments described above can be implemented by a computer program that causes a processor mounted in the same device to execute each processing described above by using hardware thereof.

A part or all of constituent elements of each device is implemented by another general-purpose or dedicated circuit, a processor, or the like, or a combination thereof. These may be configured by a single chip or may be configured by a plurality of chips connected via a bus.

A part or all of constituent elements of each device may be implemented by a combination of the above-described circuit or the like and a program.

In a case where a part or all of constituent elements of each device is implemented by a plurality of information processing apparatuses, circuits, and the like, the plurality of information processing apparatuses, circuits, and the like may be arranged in a centralized manner or in a distributed manner. For example, the information processing apparatus, the circuit, and the like may be implemented as a form in which each is connected via a communication network such as a client and server system and a cloud computing system.

Each of the above-described example embodiments is a preferred example embodiment of the present disclosure, and the scope of the present disclosure is not limited only to each of the above-described example embodiments. That is, it is possible for those of ordinary skill in the art to make modifications and substitutions of the above-described example embodiments without departing from the gist of the present disclosure, and to construct a mode in which various modifications are made.

The disclosures of the above Patent Literatures are hereby incorporated by reference into this specification and may be used as the basis or a part of the present invention, if necessary. Within the frame of the entire disclosure (including claims) of the present invention, it is possible to change and adjust the example embodiments or examples further based on the basic technical idea. Various combinations or selections (including partial deletions) of various disclosure elements (each element of each claim, each element of each example embodiment or example, each element of each drawing, and the like are included) can be made within the frame of the disclosure of the present invention. That is, it is a matter of course that the present invention includes various modifications and corrections that can be made by those of ordinary skill in the art in accordance with the entire disclosure including the appended claims and the technical idea. In particular, for numerical ranges set forth herein, any numerical value or sub-range included within the range should be construed as being specifically described, even if not stated otherwise. Furthermore, it is also deemed that the matters disclosed in the documents cited above are included in the matters disclosed in the present application to use a part or all of the matters disclosed in the documents in combination with the matters described in the present specification as part of the disclosure of the present invention according to the gist of the present invention as necessary.

REFERENCE SIGNS LIST

10, 100, 100*a*, 100*b* vehicle entry control device
11, 101, 111 information acquisition means
12, 102, 112 determination means
13, 103 notification means
104 detection means
105, 115, 125 message creation means
106 control target area storage means
107 driver information storage means
120 parking lot information acquisition means
200 driver information server
210 healthcare server
220 parking lot management server
300 vehicle
500 camera
900 information processing apparatus
901 CPU (Central Processing Unit)
902 ROM (Read Only Memory)
903 RAM (Random Access Memory)
904 program
905 storage device
906 recording medium
907 drive device
908 communication interface 909 communication network
910 input/output interface
911 bus
V vehicle
WA control target area

What is claimed is:

1. A vehicle entry control device comprising:
at least one memory configured to store instructions; and
at least one processor configured to execute the instructions to:
receive data of an image captured by at least one camera installed before a predetermined control target area capturing an image of a vehicle approaching the control target area;
detect the vehicle approaching the control target area by analyzing the image;
read a license plate from the image;
acquire, from an external server, first driver information that is information indicating a driving tendency of a driver of the vehicle approaching based on the license plate, wherein the first driver information includes at least one of an accident history and a violation history of traffic regulations of the driver;
calculate a driving skill score from the first driver information;
determine whether the vehicle is a target vehicle of entry restriction to a control target area for preventing the driver having insufficient driving skill from entering the control target area by comparing the driving skill score with a predetermined threshold; and
transmit, to the vehicle determined as the target vehicle of entry restriction, information for preventing entry into the control target area.

2. The vehicle entry control device according to claim 1, wherein the at least one processor is further configured to execute the instructions to:
notify the vehicle of a message including an instruction of a course for preventing approach to the control target area as information for preventing entry into the control target area.

3. The vehicle entry control device according to claim 1, wherein the at least one processor is further configured to execute the instructions to:
notify alternative transportation means that can be taken by a driver of the vehicle as information for preventing entry into the control target area.

4. The vehicle entry control device according to claim 3, wherein the at least one processor is further configured to execute the instructions to:
acquire vacancy information of a parking lot around the control target area; and
notify the driver of the vehicle of available parking lot information, to urge the driver to move by alternative transportation means using the parking lot.

5. The vehicle entry control device according to claim 1, wherein the at least one processor is further configured to execute the instructions to:
acquire, from a healthcare server different from the external server, second driver information indicating a health condition of the driver, and
determine whether the vehicle is a target vehicle of entry restriction to a control target area based on a combination of an evaluation result of the driving skill score calculated from the first driver information and an evaluation result of the health condition based on the second driver information.

6. The vehicle entry control device according to claim 5, wherein the at least one processor is further configured to execute the instructions to:
determine the vehicle as the target vehicle in a case where:
(i) the driving skill score is below the predetermined threshold, or
(ii) the driving skill score is below a second threshold higher than the predetermined threshold and the health condition indicates that the driver is in poor health.

7. The vehicle entry control device according to claim 5, wherein the second driver information includes at least one of body temperature and sleep time.

8. The vehicle entry control device according to claim 1, wherein the at least one processor is further configured to execute the instructions to:
notify change of automatic driving level as information for preventing entry into the control target area.

9. The vehicle entry control device according to claim 1, wherein the at least one processor is further configured to execute the instructions to:
notify speed limit information set in the control target area as information for preventing entry into the control target area.

10. The vehicle entry control device according to claim 1, wherein the first driver information indicating the driving tendency further includes an age of the driver.

11. The vehicle entry control device according to claim 1, wherein the at least one processor is further configured to execute the instructions to:
detect the vehicle when the vehicle passes a predetermined checkpoint.

12. A vehicle entry control method, comprising:
receiving data of an image captured by at least one camera installed before a predetermined control target area capturing an image of a vehicle approaching the control target area;
detecting the vehicle approaching the control target area by analyzing the image;
reading a license plate from the image;
acquiring, from an external server, driver information that is information indicating a driving tendency of a driver of the vehicle based on the license plate, wherein the driver information includes at least one of an accident history and a violation history of traffic regulations of the driver;
calculating a driving skill score from the driver information;
determining whether the vehicle is a target vehicle of entry restriction to a control target area for preventing the driver having insufficient driving skill from entering the control target area by comparing the driving skill score with a predetermined threshold; and
transmitting, to the vehicle determined to be the target vehicle of entry restriction, information for preventing entry into the control target area.

13. A non-transitory computer-readable recording medium that records a program causing a computer to execute processing comprising:
receiving data of an image captured by at least one camera installed before a predetermined control target area capturing an image of a vehicle approaching the control target area;
detecting the vehicle approaching the control target area by analyzing the image;
reading a license plate from the image;
acquiring, from an external server, driver information that is information indicating a driving tendency of a driver of the vehicle based on the license plate, wherein the driver information includes at least one of an accident history and a violation history of traffic regulations of the driver;

calculating a driving skill score from the driver information;

determining whether the vehicle is a target vehicle of entry restriction to a control target area for preventing the driver having insufficient driving skill from entering the control target area by comparing the driving skill score with a predetermined threshold; and transmitting, to the vehicle determined to be the target vehicle of entry restriction, information for preventing entry into the control target area.

* * * * *